US012794503B2

(12) United States Patent
Chen

(10) Patent No.: US 12,794,503 B2
(45) **Date of Patent: *Nov. 10, 2026**

(54) WIRELESS SIGNAL RECEIVING DEVICE AND SYSTEM

(71) Applicant: GETAC TECHNOLOGY CORPORATION, New Taipei City (TW)

(72) Inventor: Kuan-Yu Chen, Taipei City (TW)

(73) Assignee: GETAC TECHNOLOGY CORPORATION, New Taipei City (TW)

( * ) Notice: Subject to any disclaimer, the term of this patent is extended or adjusted under 35 U.S.C. 154(b) by 582 days.

This patent is subject to a terminal disclaimer.

(21) Appl. No.: 17/963,060

(22) Filed: Oct. 10, 2022

(65) Prior Publication Data

US 2023/0117259 A1 Apr. 20, 2023

Related U.S. Application Data

(60) Provisional application No. 63/255,866, filed on Oct. 14, 2021.

(51) Int. Cl.
*H04B 1/18* (2006.01)
*H04B 1/00* (2006.01)
(Continued)

(52) U.S. Cl.
CPC ............. *H04B 1/18* (2013.01); *H04B 1/0057* (2013.01); *H04B 1/0064* (2013.01); *H04B 1/16* (2013.01);
(Continued)

(58) Field of Classification Search
CPC ...... H04B 1/18; H04B 1/0057; H04B 1/0064; H04B 1/16; H04B 1/3805; H04B 2001/3811; Y02D 30/70
See application file for complete search history.

(56) References Cited

U.S. PATENT DOCUMENTS

| | | | | |
|---|---|---|---|---|
| 8,200,287 B2 * | 6/2012 | Kushida | H04B 7/0608 455/562.1 |
| 8,730,103 B2 * | 5/2014 | Chaudhary | H01Q 3/12 342/374 |

(Continued)

FOREIGN PATENT DOCUMENTS

| | | |
|---|---|---|
| CN | 101304580 A | 11/2008 |
| CN | 103560801 A | 2/2014 |

(Continued)

OTHER PUBLICATIONS

Pei Zhao et al., "Indoor wireless communication technology and engineering practice principles." Beijing University of Posts and Telecommunications Press, p. 203, 2015.

(Continued)

*Primary Examiner* — Yuwen Pan
*Assistant Examiner* — Fatuma G Sherif
(74) *Attorney, Agent, or Firm* — Andy M. Han; Han IP PLLC

(57) ABSTRACT

A wireless signal receiving device and system are provided. The wireless signal receiving system includes a wireless signal receiving device and a Global Position System (GPS) wireless signal receiving module. The wireless signal receiving device includes a first antenna for receiving wireless signals in a plurality of frequency bands, at least one second antenna for receiving first wireless signals in a predetermined frequency band, a filter coupled to the first antenna and for splitting the wireless signals in the plurality of frequency bands into second wireless signals in the predetermined frequency band, and at least one switching device coupled to the filter and the at least one second antenna and for respectively outputting the first wireless signals and the second wireless signals. The GPS wireless signal receiving module is coupled to the wireless signal
(Continued)

receiving device, and is for receiving the first wireless signals or the second wireless signals.

8 Claims, 1 Drawing Sheet

(51) Int. Cl.
*H04B 1/16* (2006.01)
*H04B 1/3805* (2015.01)

(52) U.S. Cl.
CPC .... *H04B 1/3805* (2013.01); *H04B 2001/3811* (2013.01)

(56) References Cited

U.S. PATENT DOCUMENTS

| | | | | |
|---|---|---|---|---|
| 10,505,700 | B1 | 12/2019 | Lan et al. | |
| 12,228,655 | B1 | 2/2025 | MacGougan et al. | |
| 12,308,873 | B2 * | 5/2025 | Chen | H04B 1/18 |
| 2002/0107033 | A1 * | 8/2002 | Kim | H01Q 21/28 455/12.1 |
| 2003/0008660 | A1 | 1/2003 | Forrester | |
| 2003/0125001 | A1 * | 7/2003 | Kushihi | H04B 1/406 455/280 |
| 2006/0121870 | A1 | 6/2006 | Chu | |
| 2006/0152408 | A1 | 7/2006 | Leinonen et al. | |
| 2008/0055172 | A1 | 3/2008 | Chen | |
| 2011/0249760 | A1 | 10/2011 | Chrisikos et al. | |
| 2012/0202561 | A1 | 8/2012 | Robinett | |
| 2012/0243447 | A1 * | 9/2012 | Weissman | H04B 1/0458 370/280 |
| 2017/0180030 | A1 * | 6/2017 | Mori | H04B 7/0808 |
| 2018/0123632 | A1 | 5/2018 | Posselt et al. | |
| 2019/0364612 | A1 | 11/2019 | Lan et al. | |
| 2020/0132855 | A1 | 4/2020 | Lee et al. | |
| 2020/0244408 | A1 | 7/2020 | Kim et al. | |
| 2021/0135690 | A1 | 5/2021 | Pehlke | |
| 2022/0214460 | A1 * | 7/2022 | Hu | G01S 19/31 |

FOREIGN PATENT DOCUMENTS

| | | | |
|---|---|---|---|
| CN | 104092526 | A | 10/2014 |
| CN | 105655713 | A | 6/2016 |
| CN | 106033840 | A | 10/2016 |
| CN | 106100686 | A | 11/2016 |
| CN | 106330220 | A | 1/2017 |
| CN | 106450757 | A | 2/2017 |
| CN | 106877914 | A | 6/2017 |
| CN | 108233948 | A | 6/2018 |
| CN | 108832988 | A | 11/2018 |
| CN | 109756238 | A | 5/2019 |
| CN | 112164893 | A | 1/2021 |
| CN | 112714415 | A | 4/2021 |
| KR | 20050028688 | A | 3/2005 |
| KR | 100895795 | B1 | 4/2009 |
| TW | 201611410 | A | 3/2016 |
| WO | WO2017071331 | A1 | 5/2017 |
| WO | WO2020/046180 | A1 | 3/2020 |

OTHER PUBLICATIONS

Yu, “Application of Integrated Audio Front-End in Medium and Shortwave Transmitting Stations”, China Broadnet Technical Communication, Dec. 31, 2024, pp. 149-154.

* cited by examiner

WIRELESS SIGNAL RECEIVING DEVICE AND SYSTEM

The application claims priority to U.S. Provisional Application No. 63/255,866, filed on Oct. 14, 2021, the disclosure of which is hereby incorporated by reference herein in its entirety.

BACKGROUND OF THE INVENTION

Field of the Invention

The present invention relates to a wireless signal receiving device and system and, more particularly, to a wireless signal receiving device and system having a function of switching wireless signal sources.

Description of the Prior Art

Current vehicles are usually provided with, for example, Global Positioning System (GPS) wireless signal receiving devices to acquire positioning information.

In order to obtain a better positioning precision, in current applications of the GPS, wireless signals in the L5 frequency band are newly added apart from wireless signals in the original L1 frequency band. Due to the newly added wireless signals in the L5 frequency band, the GPS provides a lower positioning error and an improved precision.

Further, in order to receive wireless signals of better quality, antennas are also arranged outside vehicles, in an attempt to acquire GPS wireless signals of better quality.

However, wireless signals of better quality are not always necessarily acquired with the antennas arranged on the outside, because environments on the outside can change constantly, and a situation that is unfavorable to propagation of wireless signals from certain directions may occur.

SUMMARY OF THE INVENTION

In view of the issues above, the present invention provides a wireless signal receiving device and system, which is capable of selectively switching to a wireless signal source with wireless signals having better quality among multiple wireless signal sources, so as to provide a user with selectivity for wireless signals; for example, providing the user with the possibility of other wireless signal sources when the current wireless signals are unstable or even unusable.

A wireless signal receiving device provided according to the present invention includes: a first antenna, for receiving wireless signals in a plurality of frequency bands; at least one second antenna, for receiving first wireless signals in a predetermined frequency band; a filter, coupled to the first antenna, for splitting the wireless signals in the plurality of frequency bands into second wireless signals in the predetermined frequency band; and at least one switching device, coupled to the filter and the at least one second antenna, for respectively outputting the first wireless signals and the second wireless signals.

In one embodiment of the present invention, the switching device of the wireless signal receiving device above further includes: a wireless signal intensity analysis unit, for analyzing intensities of the first wireless signals and the second wireless signals, and respectively outputting corresponding wireless signal intensity analysis results. The switching device outputs the first wireless signals and the second wireless signals according to the corresponding wireless signal intensity analysis results, respectively.

A wireless signal receiving system provided by the present invention includes a wireless signal receiving device and a Global Position System (GPS) wireless signal receiving module. The wireless signal receiving device includes: a first antenna, for receiving wireless signals in a plurality of frequency bands; at least one second antenna, for receiving first wireless signals in a predetermined frequency band; a filter, coupled to the first antenna, for splitting the wireless signals in the plurality of frequency bands into second wireless signals in the predetermined frequency band; and at least one switching device, coupled to the filter and the at least one second antenna, for respectively outputting the first wireless signals and the second wireless signals. The GPS wireless signal receiving module is coupled to the wireless signal receiving device, and is for receiving the first wireless signals or the second wireless signals.

In one embodiment of the present invention, the switching device of the wireless signal receiving system above further includes: a wireless signal intensity analysis unit, for analyzing intensities of the first wireless signals and the second wireless signals, and respectively outputting corresponding wireless signal intensity analysis results. The switching device outputs the first wireless signals and the second wireless signals according to the corresponding wireless signal intensity analysis results, respectively.

In one embodiment of the present invention, in the wireless signal receiving system and the wireless signal receiving device above, the wireless signals in the plurality of frequency bands, the first wireless signals in the predetermined frequency band and the second wireless signals in the predetermined frequency band include wireless signals in the L1 frequency band or the L5 frequency band of the GPS.

In one embodiment of the present invention, in the wireless signal receiving system and the wireless signal receiving device above, the first antenna serves as an external antenna and is arranged on an outer surface of the wireless signal receiving device, and the second antenna serves as an internal antenna and is arranged in an accommodating space of the wireless signal receiving device.

In one embodiment of the present invention, in the wireless signal receiving system and the wireless signal receiving device above, wireless signal frequency bands of the first wireless signals in the predetermined frequency band and the second wireless signals in the predetermined frequency band are the same frequency band.

To better understand the above and other objects, features and advantages of the present invention, preferred embodiments are described in detail with the accompanying drawings below.

DETAILED DESCRIPTION OF THE EMBODIMENTS

Figure 1:
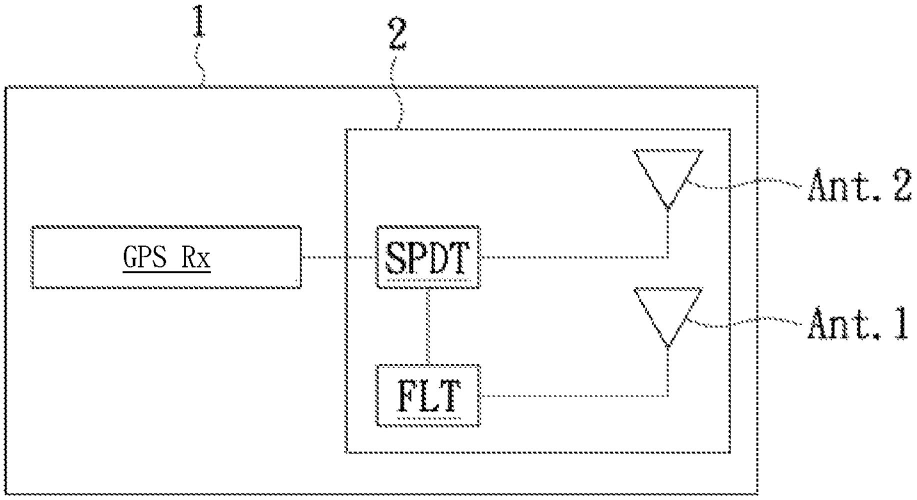
FIG. 1 is a block diagram of a wireless signal receiving system provided according to an embodiment of the present invention.

Refer to FIG. 1 showing a block diagram of a wireless signal receiving system provided according to an embodiment of the present invention.

In this embodiment, a wireless signal receiving system 1 of the present invention includes a first antenna Ant.1, a second antenna Ant.2, a switching device SPDT, a filter FLT, a Global Positioning System (GPS) wireless signal receiving module GPS Rx. A wireless signal receiving device 2 consists of the first antenna Ant.1, the second antenna Ant.2, the switching device SPDT and the filter FLT. The first antenna Ant.1 is coupled to the filter FLT, the second antenna Ant.2 is coupled to the switching device SPDT, and the switching device SPDT is coupled to the filter FLT and the GPS wireless signal receiving module GPS Rx.

The wireless signal receiving system 1 of the present invention can receive wireless signals in a plurality of frequency bands by the first antenna Ant.1, split the wireless signals in the plurality of frequency bands into second wireless signals in the predetermined frequency band by the filter FLT, receive first wireless signals in the predetermined frequency band by the second antenna Ant.2, output the first wireless signals and the second wireless signals to the switching device SPDT, and output the first wireless signals and the second wireless signals by the switching device SPDT to the GPS wireless signal receiving module GPS Rx, respectively.

For example, wireless signals in the plurality of frequency bands including the L1 frequency band and the L5 frequency band of the GPS are received by the first antenna Ant.1, the wireless signals in the plurality of frequency bands including the L1 frequency band and the L5 frequency band of the GPS are split into second wireless signals in the L1 frequency band of the GPS (alternatively, split into second wireless signals in the L5 frequency band of the GPS) by the filter FLT, first wireless signals in the L1 frequency band of the GPS (alternatively, first wireless signals in the L5 frequency band of the GPS) are directly received by the second antenna Ant.2, the first wireless signals and the second wireless signals both in the L1 frequency band (or both in the L5 frequency band) are output to the switching device SPDT, and the first wireless signals and the second wireless signals are output by the switching device SPDT, respectively. That is to say, the switching device SPDT does not simultaneously output the first wireless signals and the second wireless signals, and outputs only either the first wireless signals or the second wireless signals at one moment to the GPS wireless signal receiving module GPS Rx.

In the wireless signal receiving system 1 of the present invention, the first antenna Ant.1 is coupled to the filter FLT, and is for receiving the wireless signals in the plurality of frequency bands and outputting the received wireless signals to the filter FLT. For example, the first antenna Ant.1 can receive the wireless signals in the plurality of frequency bands including the L1 frequency band and the L5 frequency band of the GPS. By receiving all the wireless signals in the plurality of frequency bands once, the number of antennas needed can be reduced. Thus, with the reduced number of antennas needed, in addition to increasing design space available to other components during circuit design, the development time is further shortened (in general, the location of an antenna severely affects a reception effect of wireless signals, and so each antenna needs to be separately tested in order to determine an optimal placement position in a current design).

In the wireless signal receiving system 1 of the present invention, the filter FLT is coupled to the first antenna Ant.1 and the switching device SPDT, and is for splitting the wireless signals in the plurality of frequency bands received by the first antenna Ant.1 into the second wireless signals in the predetermined frequency band, and outputting the second wireless signals in the predetermined frequency band to the switching device SPDT. For example, the wireless signals in the plurality of frequency bands including the L1 frequency band and the L5 frequency band of the GPS are received by the first antenna Ant.1, the wireless signals in the plurality of frequency bands including the L1 frequency band and the L5 frequency band of the GPS are split into second wireless signals in the L1 frequency band of the GPS (alternatively, split into second wireless signals in the L5 frequency band of the GPS) by the filter FLT, and the second wireless signals in the L1 frequency band of the GPS are output to the switching device SPDT.

In the wireless signal receiving system 1 of the present invention, the second antenna Ant.2 is coupled to the switching device SPDT, and is for receiving the first wireless signals in the predetermined frequency band, and outputting the first wireless signals to the switching device SPDT. For example, the second antenna Ant.2 can directly receive the first wireless signals in the L1 frequency band of the GPS (alternatively, directly receive the first wireless signals in the L5 frequency band of the GPS), and output the first wireless signals in the same frequency band as the second wireless signals to the switching device SPDT (for example, when the frequency band of the second wireless signals is the L1 frequency band of the GPS, the second antenna Ant.2 directly receives the first wireless signals in the L1 frequency band of the GPS having the same frequency band as the second wireless signals, and outputs the first wireless signals to the switching device SPDT).

In the wireless signal receiving system 1 of the present invention, the switching device SPDT is coupled to the filter FLT, the second antenna Ant.2 and the GPS wireless signal receiving module GPS Rx, and is for receiving the first wireless signals in the predetermined frequency band and the second wireless signals in the predetermined frequency band, and outputting the first wireless signals and the second wireless signals, respectively. For example, the switching device SPDT can receive the first wireless signals and the second wireless signals both in the L1 frequency band of the GPS, and output the first wireless signals and the second wireless signals in the same frequency band to the GPS wireless signal receiving module GPS Rx, respectively. That is to say, the switching device SPDT does not simultaneously output the first wireless signals and the second wireless signals, and outputs only either the first wireless signals or the second wireless signals at one moment to the GPS wireless signal receiving module GPS Rx, so as to selectively switching to wireless signals (in the same frequency band) having better wireless signal quality. In one embodiment of the present invention, the switching device SPDT further includes a wireless signal intensity analysis unit (not shown) for analyzing intensities of the first wireless signals and the second wireless signals, and outputting corresponding wireless signal intensity analysis results, respectively. Moreover, the switching device SPDT outputs the first wireless signals and the second wireless signals according to the corresponding wireless signal intensity analysis results, respectively. For example, the wireless signal intensity analysis unit can analyze the first wireless signals and the second wireless signals by using algorithm techniques such as linear regression, deep learning, neural networks, back-propagation, convolutional neural network (CNN) and recurrent neural network (RNN), and output the corresponding wireless signal intensity analysis results, respectively. The switching device SPDT respectively outputs the first wireless signals and the second wireless signals according to the corresponding wireless signal intensity analysis results, so as to respond to changes in wireless signal intensities caused by changes in environment conditions and to selectively switch to the wireless signals most suitable for a user. It should be noted that, the switching device SPDT can perform switching according to automatic detection of the corresponding wireless signal intensity analysis results, or can be manually switched by a user. The switching device SPDT of the present invention is not limited to a specific switching means.

In the wireless signal receiving system 1 of the present invention, the GPS wireless signal receiving module GPS Rx is coupled to the wireless signal receiving device 2, and is for receiving the first wireless signals or the second wireless signals output by the switching device SPDT, and providing the first wireless signals or the second wireless signals as signal sources of the wireless network within a network coverage range of the GPS wireless signal receiving module GPS Rx for the use of a wireless network of a user.

Figure 2:
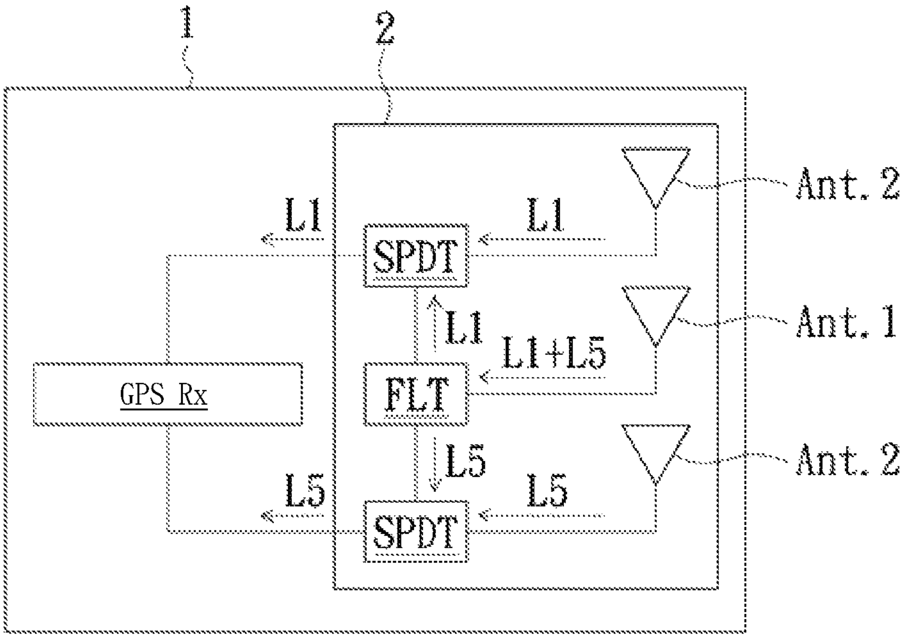
FIG. 2 is a block diagram of a wireless signal receiving system according to another embodiment of the present invention.

Refer to FIG. 2 showing a block diagram of a wireless signal receiving system according to another embodiment of the present invention.

In this embodiment, another implementation form including one first antenna Ant.1, two second antennas Ant.2, two switching devices SPDT, one filter FLT, and one dual-feed GPS wireless signal receiving module GPS Rx is provided. The functions of the first antenna Ant.1, the second antennas Ant.2, the switching devices SPDT and the filter FLT used in this embodiment are the same as those used in the previous embodiment, and the associated details are omitted herein for brevity.

The wireless signal receiving system 1 of the present invention can receive wireless signals in a plurality of frequency bands by the first antenna Ant.1, split the wireless signals in the plurality of frequency bands into second wireless signals in two predetermined frequency bands by the filter FLT, receive the first wireless signals in the predetermined frequency bands that are different frequency bands by the two second antennas Ant.2, respectively, output the first wireless signals and the second wireless signals that are the same to two different switching devices SPDT, and output the first wireless signals and the second wireless signals in the same frequency band by the switching devices SPDT to the dual-feed GPS wireless signal receiving module GPS Rx, respectively.

For example, in the present invention, wireless signals in a plurality of frequency bands including the L1 frequency band and the L5 frequency band of the GPS are received by the first antenna Ant.1, the wireless signals in the plurality of frequency bands including the L1 frequency band and the L5 frequency band of the GPS are split into second wireless signals in the L1 frequency band of the GPS and second wireless signals in the L5 frequency band of the GPS by the filter FLT, first wireless signals in the L1 frequency band of the GPS and first wireless signals in the L5 frequency band of the GPS are directly received by the two second antennas Ant.2, respectively, the first wireless signals and the second wireless signals that are both in the L1 frequency band and both in the L5 frequency band are output to the different switching devices SPDT, and the first wireless signals and the second wireless signals in the same frequency band are output by the switching devices SPDT to the dual-feed GPS wireless signal receiving module GPS Rx, respectively.

In another embodiment, the first antenna Ant.1 can serve as an external antenna and is arranged on an outer surface of the wireless signal receiving device 2, and the second antenna Ant.2 can serve as an internal antenna and is arranged in an accommodating space of the wireless signal receiving device 2. In general, the first antenna Ant.1 arranged on the outer surface of the wireless signal receiving device 2 can receive wireless signals of better quality. However, due to constant changes in the outside environment, a situation that is unfavorable to propagation of wireless signals from certain directions may occur. Thus, the present invention configures the first antenna Ant.1 to be an external antenna and the second antenna Ant.2 to be an internal antenna, so as to respond to changes in the wireless signal intensities caused by changes in environment conditions. Accordingly, the switching device SPDT is allowed to selectively switch to wireless signals most suitable for a user, and respectively output the first wireless signals and the second wireless signals in the same frequency band to the dual-feed GPS wireless signal receiving module GPS Rx.

In conclusion, the present invention provides a wireless signal receiving device and system, which is capable of selectively switching to a wireless signal source with wireless signals having better quality among multiple wireless signal sources, so as to provide a user with selectivity for wireless signals; for example, providing the user with the possibility of other wireless signal sources when the current wireless signals are unstable or even unusable.

The present invention is disclosed as the embodiments above. However, these embodiments are not to be construed as limitations to the present invention. Slight modifications and variations may be made to the embodiments by a person skilled in the art without departing from the spirit and scope of the present invention. Therefore, the scope of legal protection of the present invention shall be defined by the appended claims.

What is claimed is:

1. A wireless signal receiving device, comprising:

a first antenna, for receiving wireless signals in a plurality of frequency bands, wherein the first antenna serves as an external antenna and is arranged on an outer surface of the wireless signal receiving device;

at least one second antenna, for receiving first wireless signals in a predetermined frequency band, wherein the at least one second antenna serves as an internal antenna and is arranged in an accommodating space of the wireless signal receiving device;

a filter, coupled to the first antenna, for splitting the wireless signals received via the first antenna in the plurality of frequency bands into second wireless signals in the predetermined frequency band supported by the at least one second antenna; and at least one switching device, coupled to the filter and the at least one second antenna, for outputting the first wireless signals and the second wireless signals, respectively.

2. The wireless signal receiving device according to claim 1, wherein the wireless signals in the plurality of frequency bands, the first wireless signals in the predetermined frequency band and the second wireless signals in the predetermined frequency band comprise wireless signals in an L1 frequency band or an L5 frequency band of a Global Positioning System (GPS).

3. The wireless signal receiving device according to claim 1, wherein wireless signal frequency bands of the first wireless signals in the predetermined frequency band and the second wireless signals in the predetermined frequency band are the same frequency band.

4. The wireless signal receiving device according to claim 1, wherein the switching device further comprises:

a wireless signal intensity analysis unit, for analyzing intensities of the first wireless signals and the second wireless signals, and outputting corresponding wireless signal intensity analysis results, respectively;

wherein, the switching device outputs the first wireless signals and the second wireless signals according to the corresponding wireless signal intensity analysis results, respectively.

5. A wireless signal receiving system, comprising:

a wireless signal receiving device, comprising:

a first antenna, for receiving wireless signals in a plurality of frequency bands, wherein the first antenna serves as an external antenna and is arranged on an outer surface of the wireless signal receiving device;

at least one second antenna, for receiving first wireless signals in a predetermined frequency band, wherein the at least one second antenna serves as an internal antenna and is arranged in an accommodating space of the wireless signal receiving device;

a filter, coupled to the first antenna, for splitting the wireless signals received via the first antenna in the plurality of frequency bands into second wireless signals in the predetermined frequency band supported by the at least one second antenna; and at least one switching device, coupled to the filter and the at least one second antenna, for outputting the first wireless signals and the second wireless signals, respectively; and a Global Positioning System (GPS) wireless signal receiving module, coupled to the wireless signal receiving device, for receiving the first wireless signals or the second wireless signals.

6. The wireless signal receiving system according to claim 5, wherein the wireless signals in the plurality of frequency bands, the first wireless signals in the predetermined frequency band and the second wireless signals in the predetermined frequency band comprise wireless signals in an L1 frequency band or an L5 frequency band of a Global Positioning System (GPS).

7. The wireless signal receiving system according to claim 5, wherein wireless signal frequency bands of the first wireless signals in the predetermined frequency band and the second wireless signals in the predetermined frequency band are the same frequency band.

8. The wireless signal receiving system according to claim 5, wherein the switching device further comprises:

a wireless signal intensity analysis unit, for analyzing intensities of the first wireless signals and the second wireless signals, and outputting corresponding wireless signal intensity analysis results, respectively;

wherein, the switching device outputs the first wireless signals and the second wireless signals according to the corresponding wireless signal intensity analysis results, respectively.

* * * * *